(12) United States Patent
Freese (10) Patent No.: US 8,534,626 B1
(45) Date of Patent: Sep. 17, 2013

(54) DUAL-CONFIGURATION HANGER (75) Inventor: Lawrence O. Freese, Charlotte, NC (US)

(73) Assignee: Brica, Inc., Charlotte, NC (US)

(*) Notice: Subject to any disclaimer, the term of this patent is extended or adjusted under 35 U.S.C. 154(b) by 0 days.

(21) Appl. No.: 13/009,308

(22) Filed: Jan. 19, 2011

Related U.S. Application Data (60) Provisional application No. 61/296,266, filed on Jan. 19, 2010.

(51) Int. Cl.
F16B 45/00 (2006.01)

(52) U.S. Cl.
USPC .............................. 248/305; 248/308; 24/376

(58) Field of Classification Search
USPC ................. 248/305, 308; 294/114, 118, 111; 43/5; D8/367
See application file for complete search history.

(56) References Cited

U.S. PATENT DOCUMENTS

| 252,441 | A | * | 1/1882 | Edge ................................ 63/10 |
| 252,444 | A | * | 1/1882 | Engel ................................ 63/8 |
| 271,121 | A | * | 1/1883 | Riley et al. ........................ 63/12 |
| 2,473,086 | A | | 6/1949 | Montero |
| 2,842,822 | A | * | 7/1958 | Bennett ........................... 24/370 |
| 3,149,390 | A | * | 9/1964 | McCoy ............................ 24/564 |
| 3,773,288 | A | | 11/1973 | Bolton |
| 3,860,210 | A | | 1/1975 | Berardinelli et al. |
| 3,861,633 | A | | 1/1975 | Rappleye et al. |
| 4,118,001 | A | | 10/1978 | Serkez |
| 4,210,302 | A | | 7/1980 | Serkez |
| 4,978,093 | A | | 12/1990 | Kennedy |
| 5,094,417 | A | | 3/1992 | Creed |
| 5,402,558 | A | * | 4/1995 | Santapa ........................... 24/511 |
| 5,488,848 | A | * | 2/1996 | Huang ........................ 70/456 R |
| 5,984,250 | A | | 11/1999 | Connor |
| D426,764 | S | | 6/2000 | Szabo |
| 6,684,465 | B1 | * | 2/2004 | Jo ................................... 24/344 |
| 6,966,550 | B2 | * | 11/2005 | Marks .............................. 269/6 |
| 7,004,682 | B1 | * | 2/2006 | Moody ...................... 405/184.4 |
| 7,175,143 | B1 | | 2/2007 | Ho |
| D569,714 | S | | 5/2008 | Stewart et al. |
| 7,458,488 | B2 | | 12/2008 | Bass et al. |
| D588,444 | S | | 3/2009 | Shamlian |
| D597,825 | S | * | 8/2009 | Ho ................................ D8/367 |
| 7,644,900 | B2 | | 1/2010 | Yap et al. |

(Continued)

OTHER PUBLICATIONS

The Mommy Hook® stroller hanger. Internet web page www.themommyhook.com. Downloaded Jan. 20, 2011. Effective date unknown.

Primary Examiner — Terrell McKinnon
Assistant Examiner — Daniel J Breslin
(74) Attorney, Agent, or Firm — The Van Winkle Law Firm; Steven C. Schnedler (57) ABSTRACT A dual-configuration hanger for hanging an article from either the handle of a carrier device such as a shopping cart or a stroller, or from a horizontal table surface such as a public diaper-changing table, and a method of using the hanger. A pivot-and-locking assembly joins the proximate ends pair of hook-like curved arms each also having a distal end. The arms pivot between a locked-closed configuration in which the distal ends are in contact with or in close proximity to each other so that the arms define essentially a closed loop; and an open configuration in which the distal ends are spaced from each other to define an opening in between the distal ends, and the curved arms define a pair of opposed hooks.

15 Claims, 11 Drawing Sheets

(56) References Cited

U.S. PATENT DOCUMENTS

| | | | |
|---|---|---|---|
| 7,766,313 B2 * | 8/2010 | Panosian | 269/37 |
| 7,837,171 B1 * | 11/2010 | Otake | 248/339 |
| D642,045 S * | 7/2011 | Sweeney | D8/356 |
| D642,450 S * | 8/2011 | Freese | D8/367 |
| 8,083,202 B1 * | 12/2011 | Hutchison | 248/691 |
| 8,122,739 B1 * | 2/2012 | Jeon | 63/14.7 |
| 8,162,276 B2 * | 4/2012 | Fathi et al. | 248/305 |
| 2002/0151930 A1 * | 10/2002 | Mills | 606/204 |
| 2005/0082319 A1 | 4/2005 | Caroselli et al. | |
| 2008/0083862 A1 * | 4/2008 | Salatka | 248/308 |
| 2008/0236195 A1 * | 10/2008 | Woebke | 63/1.14 |

\* cited by examiner

DUAL-CONFIGURATION HANGER

CROSS-REFERENCE TO RELATED APPLICATION

The benefit of U.S. Provisional Patent Application Ser. No. 61/296,266, filed Jan. 19, 2010, titled "Universal Hanger" is claimed.

BACKGROUND OF THE INVENTION

The invention relates to hangers, particularly for use by mothers, typically for use on strollers, shopping carts and other carrier structures, enabling a mother to carry more "stuff."

A prior art device, sold under the trademark THE MOMMY HOOK® (Reg. No. 3,306,126) is sold for example as a stroller accessory, and resembles an oversized carabiner. According to the manufacturer: "The Mommy Hook is a perfect stroller hanger. Built to last, lightweight and versatile, the mommy hook fits virtually all stroller handles. The Mommy Hook is made from durable, heavy-duty aluminum; it won't break like cheap plastic hangers. Its rubber guide keeps it from slipping or sliding. Use the mommy hook on your stroller. Use it on your shopping cart. Just snap it on and you are ready to roll. The Mommy Hook easily holds diaper bags, shopping bags, camera bags, groceries, purses, clothes, toys, sports gear, and much more. It's even handy for taking bags from your car to your home."

SUMMARY OF THE INVENTION

In one aspect, a dual-configuration hanger is provided. The hanger includes a pair of hook-like curved arms each having a proximate end and a distal end, and a pivot-and-locking assembly joining the proximate ends. The pivot-and-locking assembly allows the arms to pivot between a closed configuration in which the distal ends are in contact with or in close proximity to each other so that the arms define essentially a closed loop, and an open configuration in which the distal ends are spaced from each other to define an opening in between the distal ends and the curved arms define a pair of opposed hooks. The pivot-and-locking assembly includes a locking mechanism for releasably locking the arms in the closed configuration.

In another aspect, a method for hanging an article having a handle from either the handle of a carrier device or from a horizontal table surface is provided. The method includes providing a dual-configuration hanger including a pair of hook-like curved arms each having a proximate end and a distal end, and a pivot-and-locking assembly joining the proximate ends and allowing the arms to pivot between a closed configuration in which the distal ends are in contact with or in close proximity to each other so that the arms define essentially a closed loop, and an open configuration in which the distal ends are spaced from each other to define an opening in between the distal ends and the curved arms define a pair of opposed hooks, the pivot-and-locking assembly including a locking mechanism for releasably locking the arms in the closed configuration. In order to hang the article from the horizontal table surface, the method includes the steps of releasing the locking mechanism and moving the arms to the open configuration, positioning the distal end of one of the arms on the horizontal table surface so that the other arm hangs below the table surface, and positioning the article handle on the hook defined by the other arm. In order to hang the article from the carrier device handle, the method includes the steps of encircling the carrier device handle and the article handle within the curved arms by relatively moving the carrier device handle and the article handle through the opening between the distal ends of the arms, and then moving the arms to the closed configuration and allowing the locking mechanism to lock the arms in the closed configuration.

DETAILED DESCRIPTION

Embodiments of the invention provide a versatile dual-configuration hanger, which works on horizontal surfaces such as changing tables, restaurant tables, and others, in addition to use on stroller handles and shopping cart handles. Thus, there are situations (such as in public restrooms which have a diaper-changing table) where there is no place to hang a purse or diaper bag, leaving a mother with the choices of either placing such items on a floor which may not be clean, or on the changing table itself.

Dual-configuration hangers embodying the invention provide a solution to this problem, and work on horizontal surfaces such as public changing tables, as well as on the handles of carrier devices, such as stroller handles, shopping cart handles, and diaper bag handles. The subject hanger can be employed in virtually any situation where an extra loop would be handy to carry more "stuff."

Figure 1:
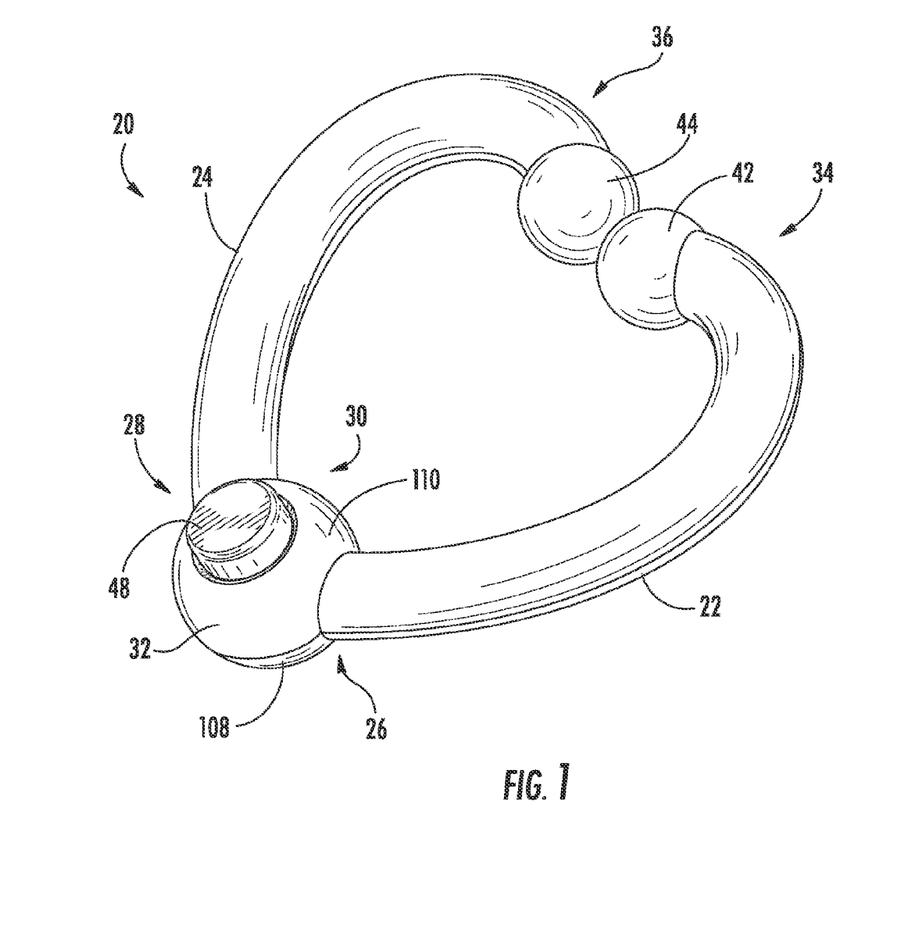
FIG. 1 is three-dimensional view of a dual-configuration hanger embodying the invention shown in its closed position, viewed from what is herein referred to as the front side.
Figure 2:
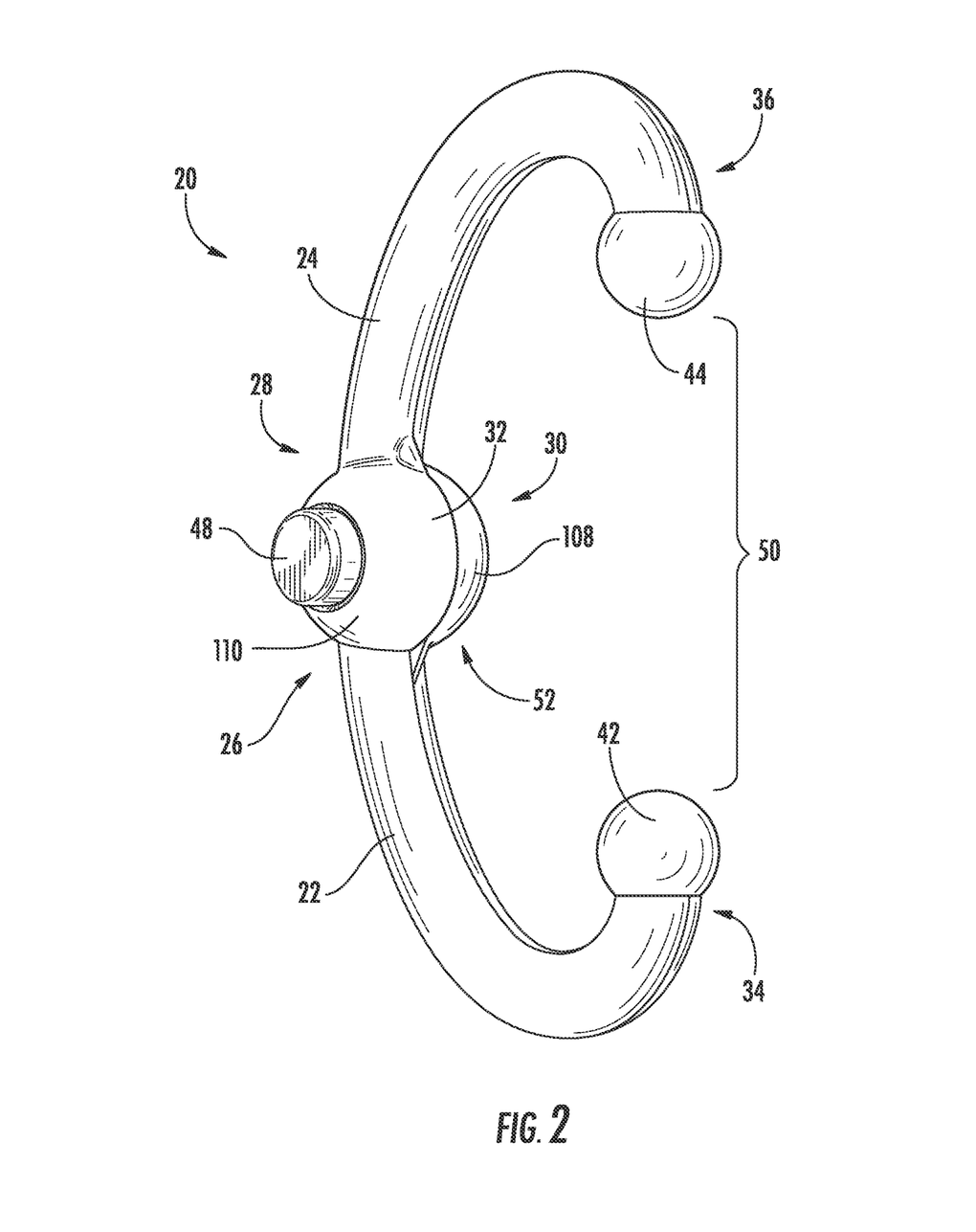
FIG. 2 is a three-dimensional view of the dual-configuration hanger of FIG. 1, shown in its open position, viewed from what is herein referred to as the front side.
Figure 7:
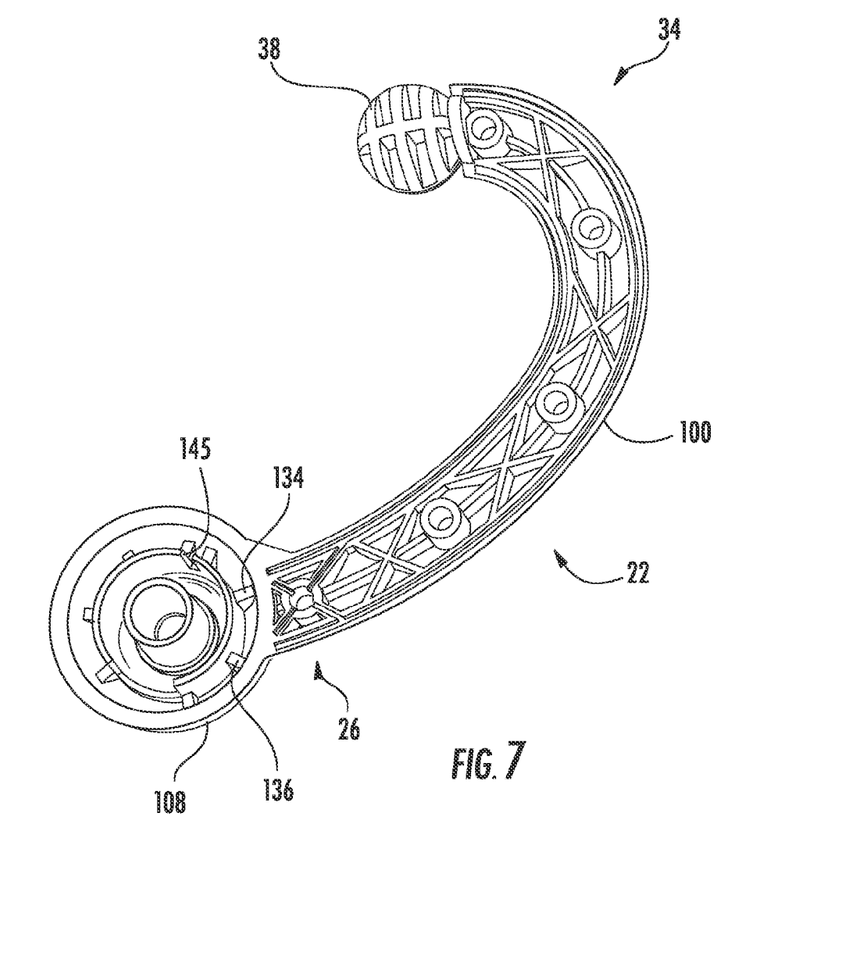
FIG. 7 is a three-dimensional view of one-half of the longitudinally-split lower arm (with reference to the orientation of FIG. 2) illustrating among other things the manner in which the lower arm half is integral with a housing semi-spherical half, the rear housing half of the pivot-and-locking assembly in the orientation of FIG. 2.
Figure 8:
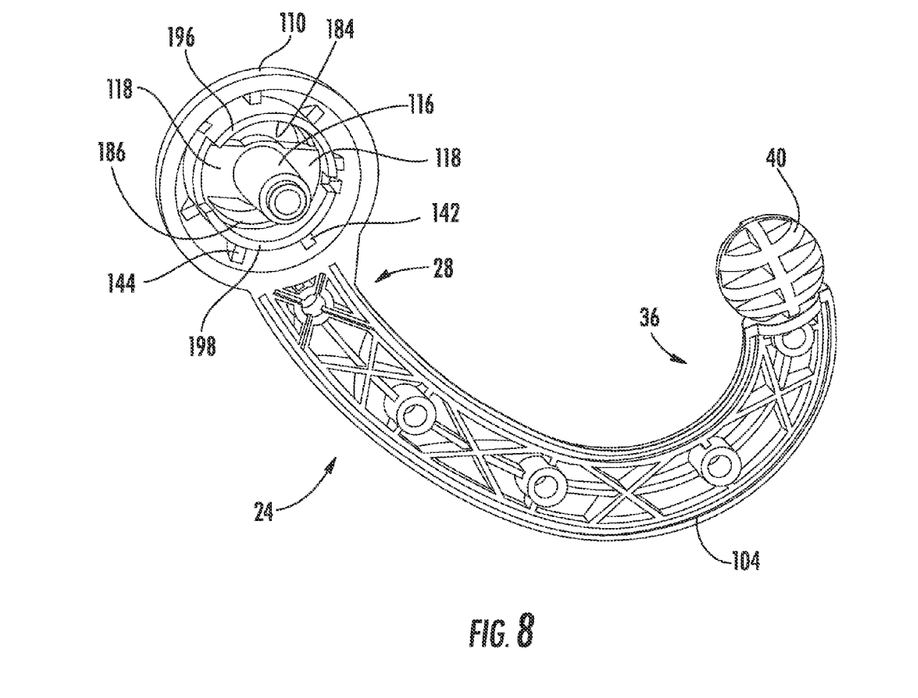
FIG. 8 is a three-dimensional view of one-half of the longitudinally-split upper arm with reference to the orientation of FIG. 2 and as viewed generally from the rear side in the orientation of FIG. 2, illustrating among other things the manner in which the upper arm half is integral with the front housing half of the generally spherical housing of the pivot-and-locking assembly.
Figure 9:
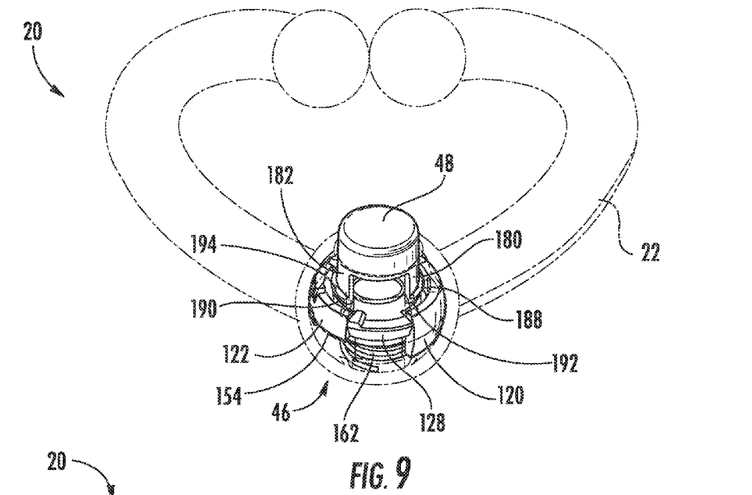
FIG. 9 is a three-dimensional view of the dual-configuration hanger in its closed position as in FIG. 1, showing details of internal parts within the pivot-and-locking assembly.
Figure 10:
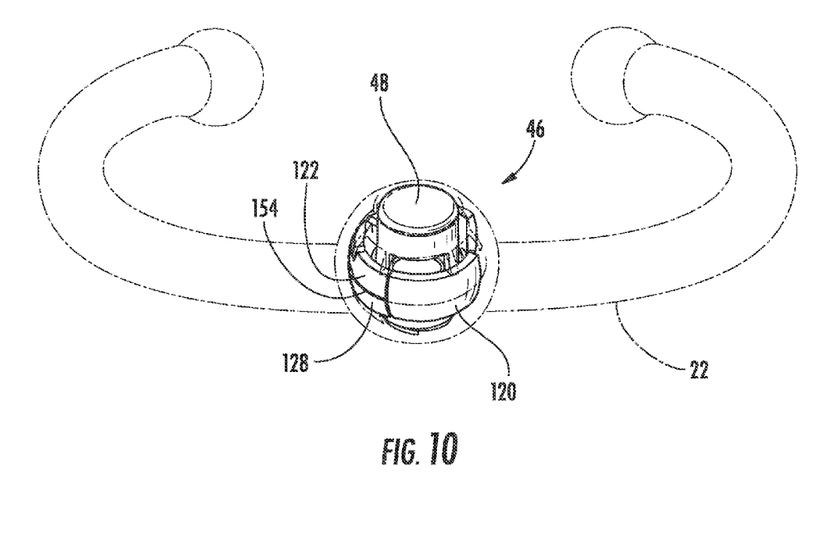
FIG. 10 is a view similar to FIG. 9, except with the dual-configuration hanger in its open position, as in FIG. 2.
Figure 11:
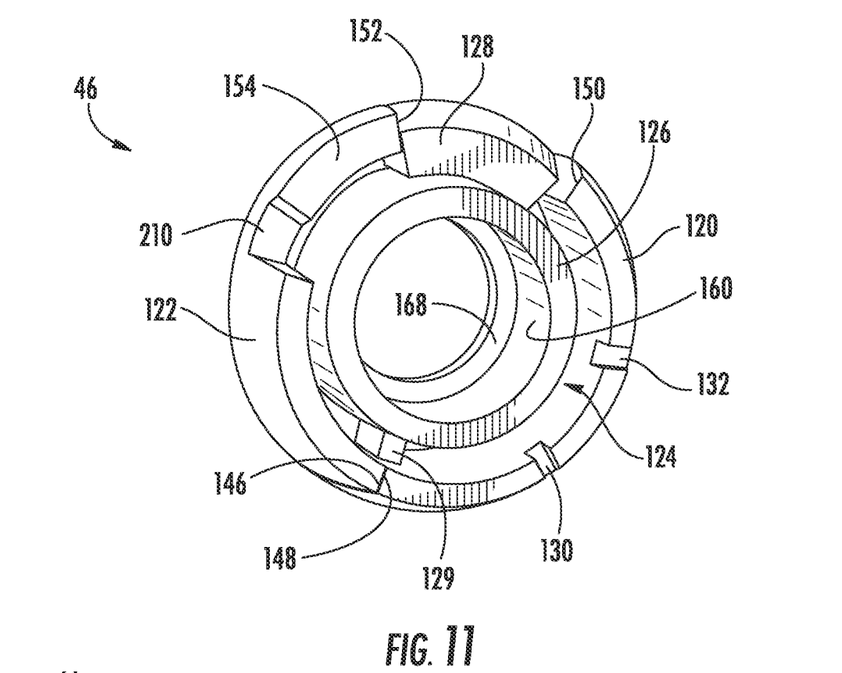
FIG. 11 is a three-dimensional view of three locking assembly elements in isolation, viewed from the right or spring side with reference to the exploded view of FIG. 6, with the three elements in their locked position corresponding to the closed configuration of FIG. 1.

Referring initially to FIGS. 1 and 2, a hanger 20 embodying the invention includes a pair of hook-like curved arms 22 and 24 joined at their proximate ends 26 and 28 by a pivot-and-locking assembly 30 having a generally spherical housing 32. The curved arms 22 and 24 have distal ends 34 and 36 which are rounded and elastomeric. More particularly, at their distal ends 34 and 36, the curved arms 22 and 24 have generally spherical rounded substrates 38 and 40 (FIGS. 7 and 8). The arms 22 and 24 and substrates 38 and 40 are made of ABS plastic, and the rounded substrates 38 and 40 have respective coatings 42 and 44 of thermoplastic elastomer (TPE) to protect horizontal surfaces and enhance frictional forces when engaged. The various elements of the hanger 20 are engineered to support a weight of up to fifty pounds in the open position of FIG. 2, and twenty-five pounds in the closed position of FIG. 1.

The pivot-and-locking assembly 30 functions in a manner such that the hanger 20 locks or "snaps" into the closed position or configuration of FIG. 1, in which the distal ends 34 and 36 are in contact with or in close proximity to each other. In this configuration, the hanger 20 can be used in essentially the same manner as the prior art oversized carabiner form of hanger for stroller handles, shopping cart handles, and diaper bag handles, as described hereinbelow in greater detail with reference to FIGS. 3 and 4.

The pivot-and-locking assembly 30, described in greater detail hereinbelow with reference to FIGS. 6-14, includes a set of three locking elements, generally designated 46, as well as a release push button 48 which, when pushed against spring force, cooperates with the locking elements 46 to release the arms 22 and 24, which are then free to move to the open position or configuration of FIG. 2. In the open position or configuration of FIG. 2, an opening 50 is defined between the distal ends 34 and 36, and the hanger 20 can be employed to hang articles over the edge of horizontal surfaces, such as public changing tables, as described hereinbelow in greater detail with reference to FIG. 5. The pivot-and-locking assembly 30 also includes a non-locking detent, generally represented at 52 and described hereinbelow in greater detail with reference to FIGS. 6-14, for holding the arms 22 and 24 in the open configuration of FIG. 2.

It will be appreciated that the hanger 20 can easily be manipulated between its closed (FIG. 1) and open (FIG. 2) positions or configurations with just one hand, for example by grasping the hanger 20 generally by the spherical housing 32 of the pivot-and-locking assembly 30, and manipulating the arms 22 and 24 and release push button 48 as required and desired.

Figure 3:
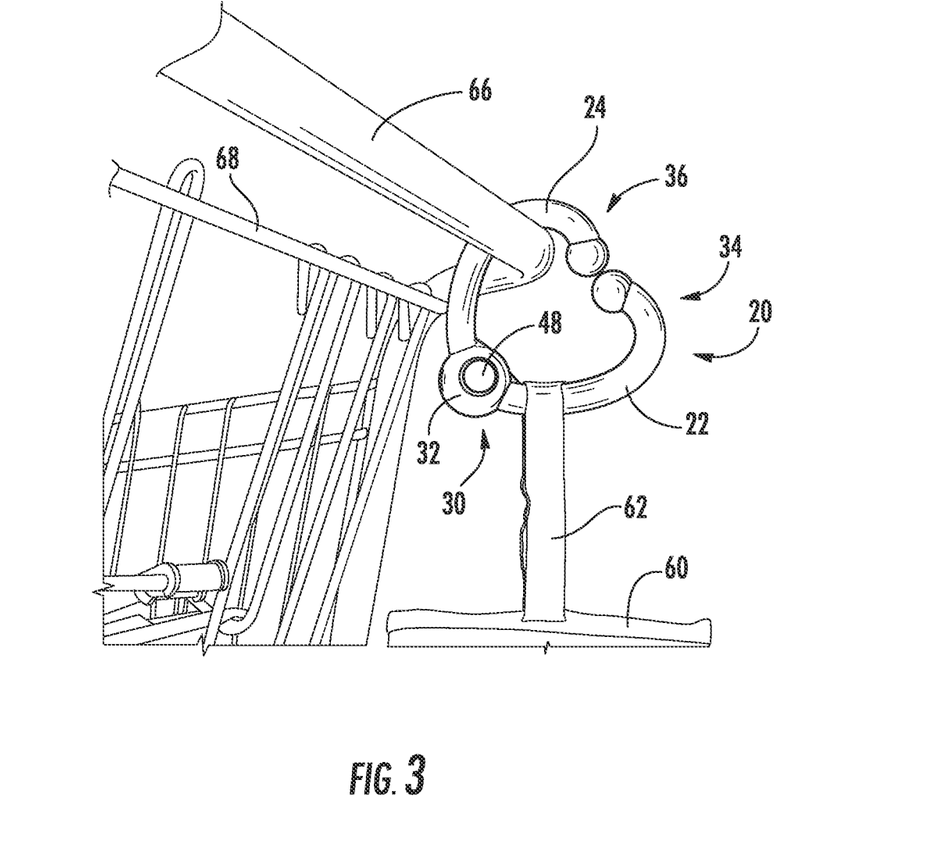
FIG. 3 illustrates the dual-configuration hanger of FIGS. 1 and 2 in use in its closed position to hang an article by an article handle from the handle of a carrier device, in the representative form of a shopping cart.

Referring now to FIG. 3, the dual-configuration hanger 20 is shown in its closed configuration employed to hang a representative article 60 having a handle 62 from the handle of a carrier device generally designated 64, more particularly from the handle 66 of a shopping cart 68.

Figure 4:
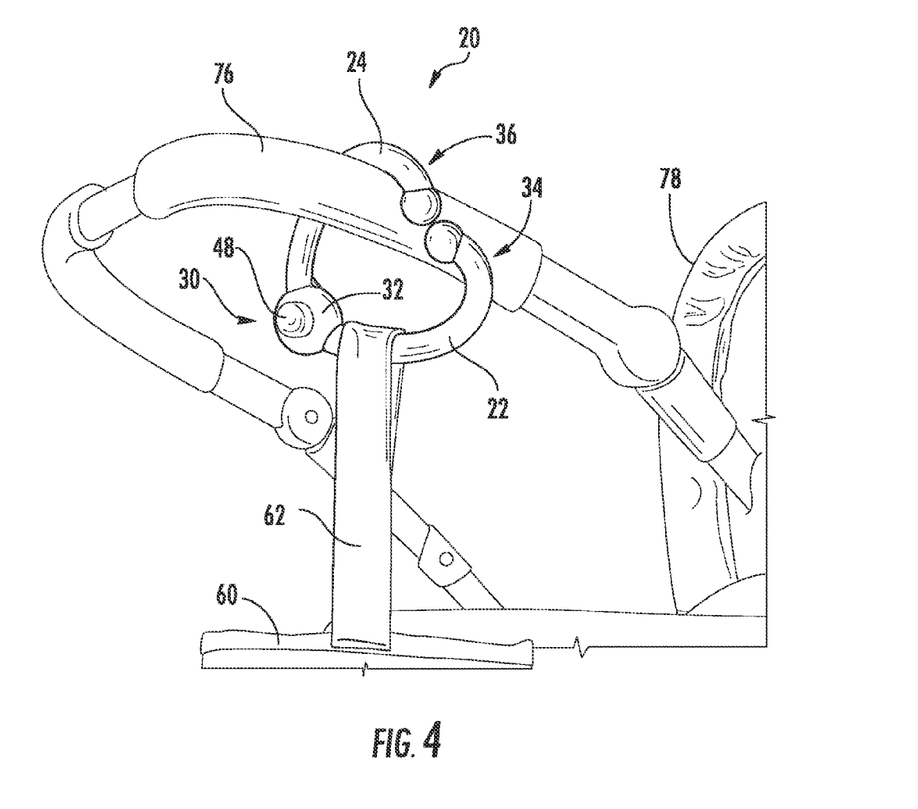
FIG. 4 illustrates the dual-configuration hanger of FIGS. 1 and 2 in use in its closed position to hang an article by an article handle from the article handle of a carrier device, in the representative form of a stroller handle.

FIG. 4 similarly illustrates the hanger 20 in its closed configuration employed to hang the article 60 from the handle of another representative carrier device also generally designated 64, more particularly the handle 76 of a stroller 78.

In order to hang the representative article 60 from the handle 66 of FIG. 3 or the handle 76 of FIG. 4, starting with the curved arms 22 and 24 open as in FIG. 2, the carrier device handle 66 or 76 and the article handle 62 are encircled within the curved arms 22 and 24 by relatively moving the handles 66 or 76 and 62 through the opening 50 between the distal ends 34 and 36 of the arms 22 and 24, and then moving the arms 22 and 24 to the closed configuration of FIG. 1, allowing the locking elements 46 within the pivot-and-locking assembly 30 to lock the arms 22 and 24 in the closed position. It will be appreciated that the relative movement can be effected with the carrier device handle 66 or 76 and the article handle 62 being stationary, while the hanger 20 is moved. Advantageously, as noted above, the hanger can be manipulated with one hand, leaving the other hand free to manipulate the article handle 62.

Figure 5:
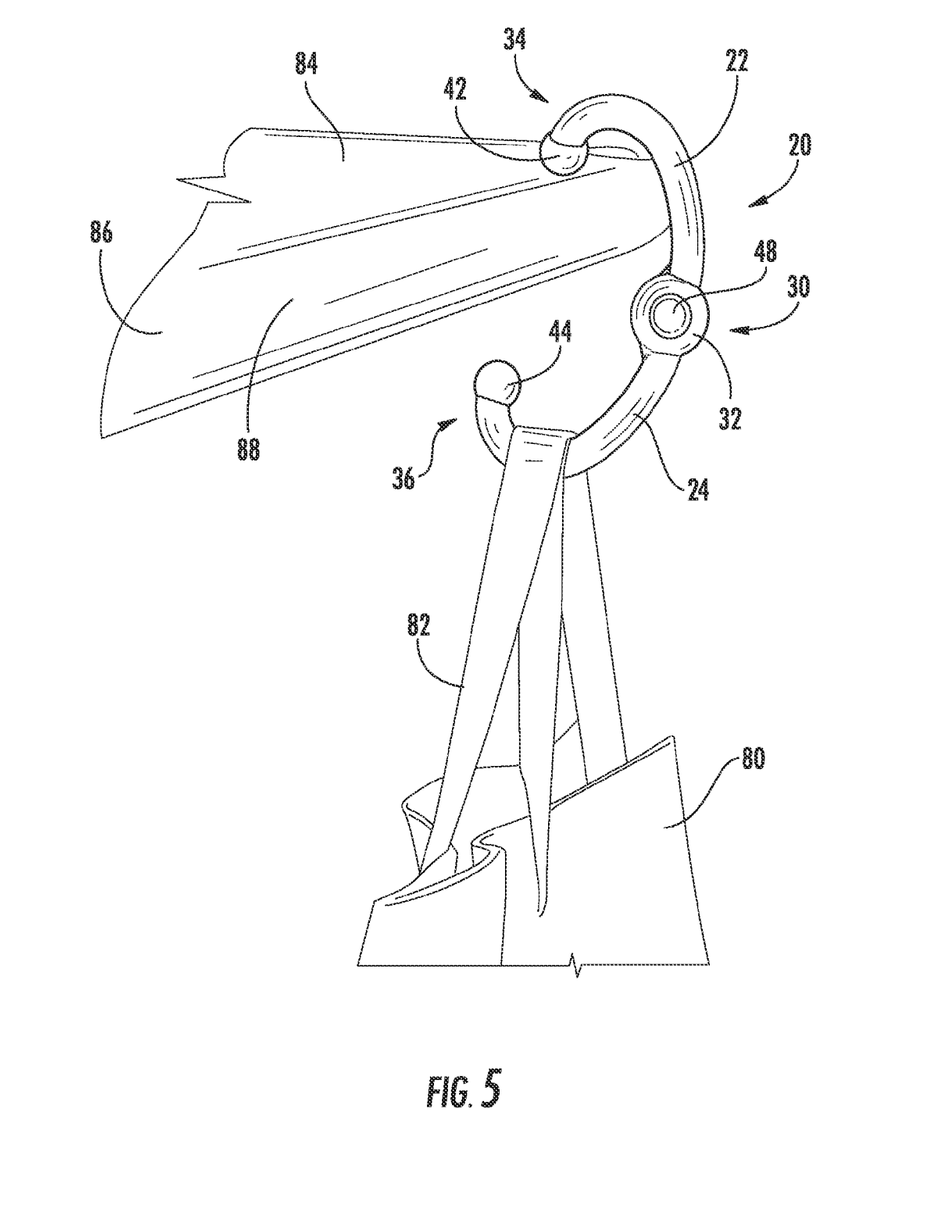
FIG. 5 illustrates the dual-configuration hanger of FIGS. 1 and 2 in use in its open configuration to hang an article by an article handle from a horizontal table surface, in the representative form of a changing table.

With reference to FIG. 5, the hanger 20 in its open configuration is employed to hang an article 80 having a handle 82 from a horizontal table surface generally designated 84, more particularly a public diaper-changing table 86 having a slightly raised and rounded edge 88. (In the orientation of FIG. 5, the hanger 20 is inverted with reference to the orientation of FIG. 2.)

Thus, in order to hang the article 80 from the diaper-changing table 86, the locking elements 46 are released by pressing the release push button 48, and moving and rotating the arms 22 and 24 to the open configuration. The distal end 36 of one of the arms 24 is positioned on the horizontal table surface 84 so that the other arm 22 hangs below the table surface 84. The article handle 82 is then placed over the hook defined by the other arm 22. The detent 52 can be felt engaging as the arms 22 and 24 fully open. In the illustrated embodiments, the arms 22 and 24 rotate as the pivot-and-locking assembly 30 approximately 60 degrees between the closed and open configurations.

The thermoplastic elastomer (TPE) coating 42 of the rounded substrate 40 protects the horizontal table surface 84, and additionally enhances frictional forces so that the hanger 20 and article 80 remain stably in position.

Figure 6:
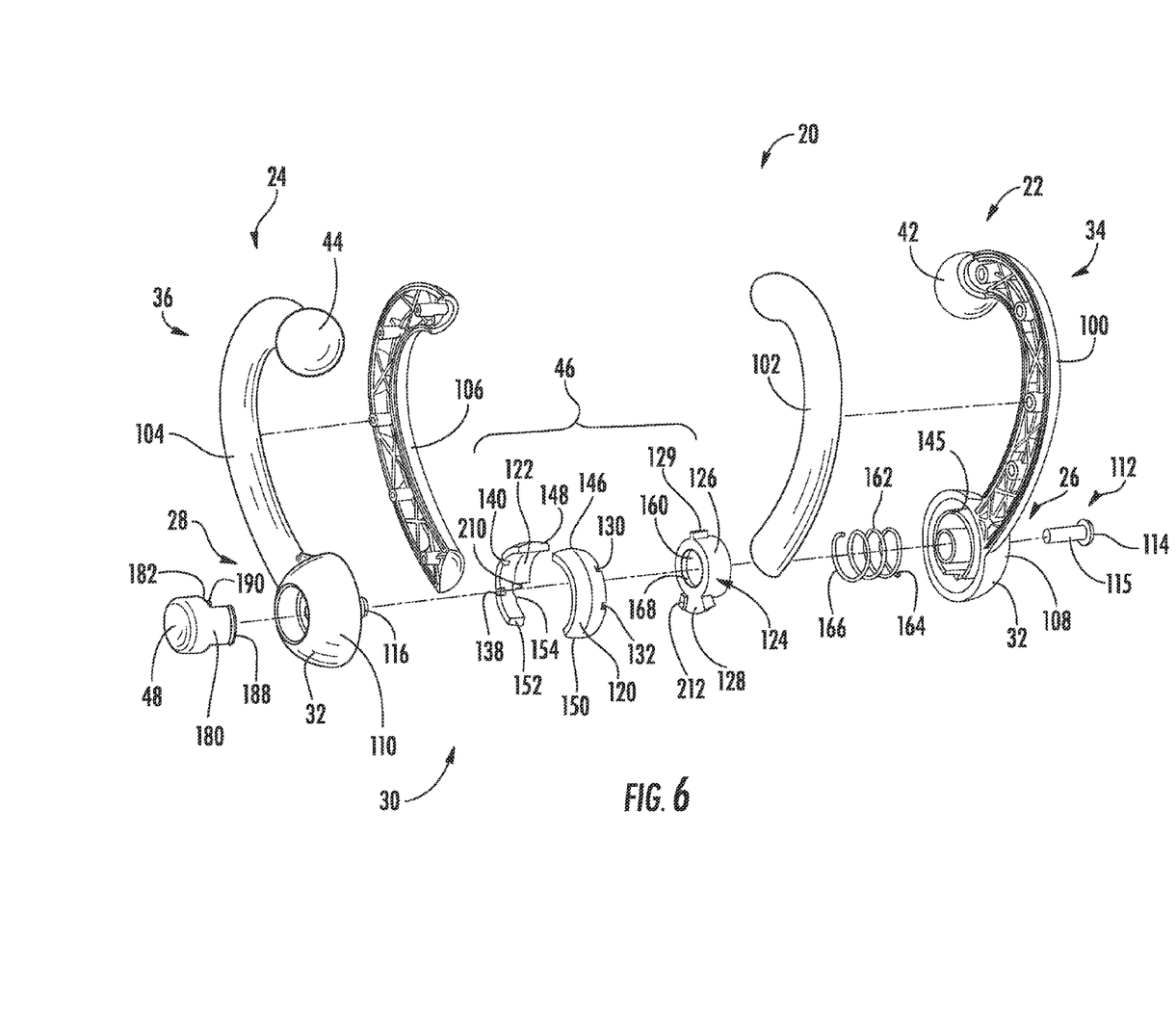
FIG. 6 is a three-dimensional exploded view of the dual-configuration hanger of FIGS. 1 and 2.

Referring now to the exploded view of FIG. 6, as well as the three-dimensional view of FIGS. 7 and 8, the curved arm 22 is split longitudinally and includes a semi-circular generally hollow outside half 100 (at the rear in the orientation of FIGS. 1 and 2) and a semi-circular generally hollow inside half 102. Likewise, the curved arm 24 is split longitudinally and includes a generally hollow outside half 104 and a generally hollow inside half 106. To provide structural rigidity, the arm halves 100, 102, 104 and 106 each include an internal triangular rib structure as illustrated.

The pivot-and-locking assembly 30 includes a pair of housing halves 108 and 110, which together define the generally spherical housing 32, and which rotate with reference to each other. The housing half 108 is referred to herein as the rear housing half, and the housing half 110 is referred to herein as the front housing half. The housing halves 108 and 110 are integral with the outside half 100 of the arm 22 and the outside half 104 of the arm 24, respectively. The inside half 102 of the arm 22 and the inside half 106 of the arm 24 terminate near the outside surface of the housing 32, at the proximate ends 26 and 28, close enough for good appearance, yet sufficiently spaced to allow relative movement as the arms 22 and 24 are manipulated between the closed position of FIG. 1 and the open position of FIG. 2.

The housing halves 108 and 110 and, accordingly, the assembly as a whole, are held together by a fastener 112. The fastener 112 is essentially a ring nail, and has a head 114 which is received in a locating recess (not shown) and bears against the outside of the rear housing half 108. The fastener 112 also has a shaft 115 which engages the interior of a boss 116 within the front housing half 110 supported by a bridge 118.

The locking elements 46 of the pivot-and-locking assembly 30 more particularly are a set 46 of three locking elements, a first fixed locking ring segment 120, fixed with reference to the rear housing half 108; a second fixed locked ring segment 122, fixed with reference to the front housing half 110; and an axially movable locking element 124 rotationally keyed to the rear housing half 108. The movable locking element includes a cylindrical central ring 126 and a radially-projecting locking ring segment 128. The movable locking element 124 also has a small radially-projecting spacer and keying tab 129 projecting outwardly from the central ring 126 diametrically opposite the radially-projecting locking ring segment 128.

In order to fixedly locate or key the first fixed locking ring segment 120 to the rear housing half 108, the first fixed locking ring segment 120 includes a pair of notches 130 and 132 which engage a pair of locating tabs 134 and 136 (best seen in FIG. 7) within the rear housing half 108. In order to fixedly locate or key the second fixed locking ring segment 122 to the front housing half 110 integral with the outside half 104 of the arm 24, the second fixed locking ring segment 122 likewise includes a pair of notches 138 and 140 which engage locating tabs 142 and 144 (visible in FIG. 8) of the front housing half 110. In order to rotationally key the movable locking element 124 to the rear housing half 108, while permitting axial movement, a tab-receiving notch 145 is provided within the rear housing half 108, visible in FIG. 7.

Figure 14:
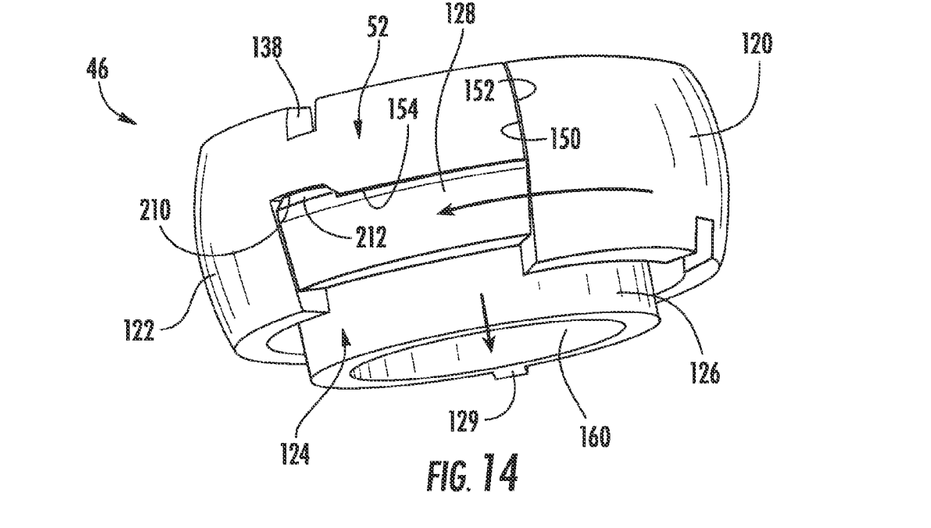
FIG. 14 is a three-dimensional view similar to that of FIG. 13, but with the elements moved to an unlocked position corresponding to the fully open configuration of FIG. 2.

The fixed locking ring segments 120 and 122 have first circumferential ends 146 and 148 which contact each other when the hanger 20 is in the closed configuration of FIG. 1, and which are rotationally spaced from each other when the hanger 20 is in the open configuration of FIG. 2. The fixed locking ring segments 120 and 122 have second circumferential ends 150 and 152 which are held apart by the radially-projecting locking ring segment 128 in the locked-closed configuration of FIG. 1, and which contact each other in the open configuration of FIG. 2. The second fixed locking ring segment 122 has a clearance rabbet 154 adjacent the second circumferential end 152 of the second fixed locking ring segment. As described in greater detail hereinbelow and as illustrated in FIG. 14, in the open configuration of FIG. 2, the clearance rabbet 154 receives the radially-projecting locking ring segment 128.

The central ring 126 of the movable locking element 124 includes a generally cylindrical central aperture 160 which receives a compression spring 162 having ends 164 and 166 (to the right and left, respectively, in the orientation of FIG. 6). The central aperture 160 is generally cylindrical, with the exception of a radially inwardly-extending flange 168 (visible in FIG. 11) against which the spring 162 end 166 bears to axially urge the movable locking element 124 to the left in the orientation of FIG. 6. The right end 164 of the compression spring 162 bears against the interior of the rear housing half 108.

The first and second fixed locking ring segments 120 and 122 and the radially-projecting locking ring segment 128 together form essentially a complete circle, locking the assembly in position when the radially-projecting locking ring segment 128 is between the second circumferential ends 150 and 152 of the first and second fixed locking ring segments 120 and 122, respectively, as illustrated in FIGS. 9, 11, 12 and 13. The compression spring 162 axially urges the movable locking element 124 towards the locked position, and maintains the locked position until released.

For rotationally unlocking the arms 22 and 24 of the hanger 20, the release push button 48 has a pair of arcuate fingers 180 and 182 which project through apertures 184 and 186 in the front housing half 110, adjacent the bridge 118. The arcuate fingers 180 and 182 have respective ends 188 and 190 which engage the movable locking element 124 to move the locking element 124 against spring force (to the right in the orientation of FIG. 6, and downwardly in the orientations of FIGS. 9, 10, 13 and 14) to disengage the radially-projecting locking ring segment 128 of the movable locking element 124 from in between the second circumferential ends 150 and 152 of the fixed locking ring segments 120 and 122, allowing relative rotation of the first and second fixed locking ring segments 120 and 122 and therefore relative rotation of the housing halves 108 and 110 through an angular extent of approximately 60 degrees to the open position or configuration of FIGS. 2, 10 and 14. The movable locking element 124 with its radially-projecting locking ring segment 128, being rotationally keyed to the rear housing half, rotates with the first fixed locking ring segment 120. FIG. 14 illustrates the relative positioning of the elements when the radially-projecting locking ring segment 128 has fully moved into the clearance rabbet 154, and the arms 22 and 24 are fully open.

In order to retain the release push button 48, at the ends 188 and 190 of the fingers 180 and 182 there are radially outwardly-projecting flanges 192 and 194 which have a ramped forward surface so that the release push button 48 can be snapped into position (as the arcuate fingers 180 and 182 slightly deflect during assembly), and the retaining flanges 192 and 194 engage retaining surfaces 196 and 198 (FIG. 8) of the front housing half 110.

Figure 12:
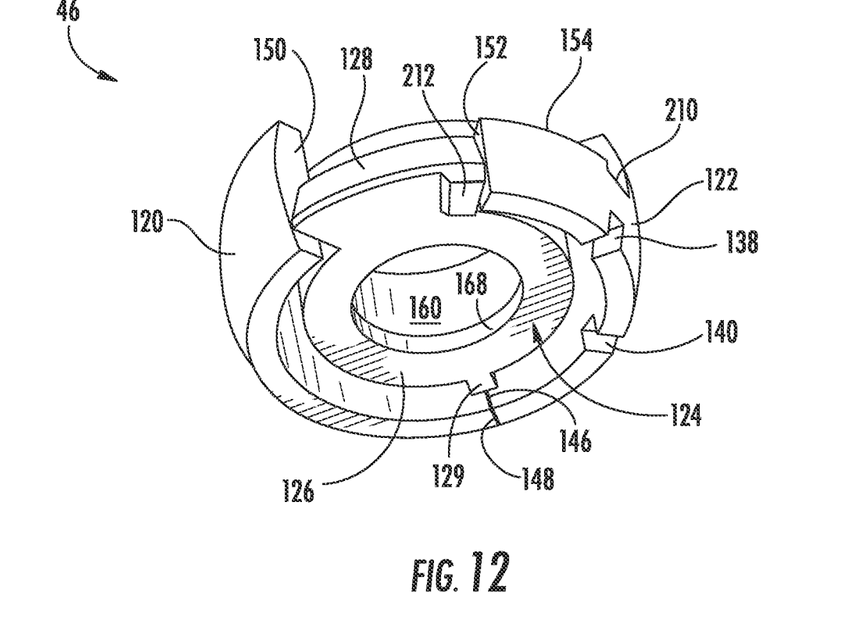
FIG. 12 is another three-dimensional view of the three locking assembly elements in isolation, viewed generally from the left or push button side with reference to the exploded view of FIG. 6, again with the three elements in their locked position corresponding to the closed configuration of FIG. 1.
Figure 13:
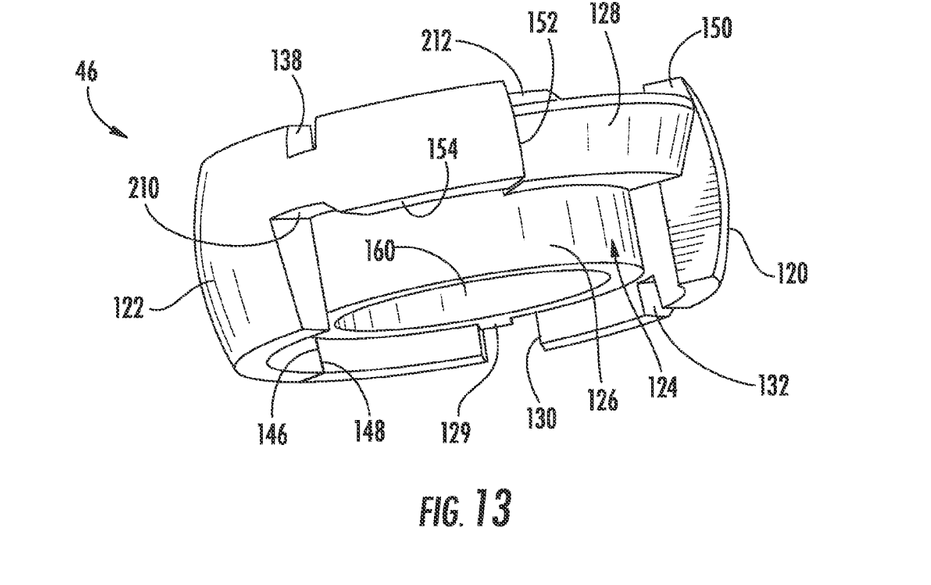
FIG. 13 is yet another three-dimensional view of the three elements of the locking assembly in isolation, in an orientation to illustrate the clearance rabbet with detent notch, as well as a radially-projecting locking ring segment with detent tab, again with the elements in the locked position corresponding to the closed configuration of FIG. 1.

As best seen in FIGS. 12, 13 and 14, to provide the non-locking detent 52, a detent notch 210 with a ramped side is provided at the inside corner of the clearance rabbet 154, and a corresponding detent tab 212 is provided on the radially-projecting locking ring segment 128. FIG. 14 shows the detent engaged, as the compression spring 162 urges the movable locking element 124, and the radially-projecting locking ring segment 128 in particular, upwardly within the interior of the clearance rabbet 154 of the second fixed locking ring segment 122.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method for hanging an article having a handle from either the handle of a carrier device or from a horizontal table surface, said method comprising:
   providing a dual-configuration hanger including
      a pair of hook-like curved arms each having a proximate end and a distal end, and a pivot-and-locking assembly joining the proximate ends and allowing the arms to pivot between a closed configuration in which the distal ends are in contact with or in close proximity to each other so that the arms define essentially a closed loop, and an open configuration in which the distal ends are spaced from and facing each other to define an opening in between the distal ends and the curved arms define a pair of opposed hooks with facing ends, the said pivot-and-locking assembly having a housing including two halves which rotate with reference to each other, the proximate ends of the arms being fixedly attached to the respective ones of the housing halves;

the pivot-and-locking assembly including a locking mechanism for releasably locking the arms in the closed configuration, the locking mechanism releasably locking the housing halves to each other against rotation in the closed configuration;

in order to hang the article from the horizontal table surface, releasing the locking mechanism and moving the arms to the open configuration, positioning the distal end of one of the arms on the horizontal table surface so that the other arm hangs below the table surface, and positioning the article handle on the hook defined by the other arm; and in order to hang the article from the carrier device handle, encircling the carrier device handle and the article handle within the curved arms by relatively moving the carrier device handle and the article handle through the opening between the distal ends of the arms, and then moving the arms to the closed configuration and allowing the locking mechanism to lock the arms in the closed configuration.

2. The method of claim 1, which comprises providing a dual-configuration hanger wherein the distal ends are generally spherical and elastomeric.

3. The method of claim 1, which comprises providing a dual-configuration hanger wherein the pivot-and-locking assembly includes a push button for releasing the locking mechanism from the closed configuration.

4. The method of claim 1, which comprises employing one hand to manipulate the arms between the closed and open positions, while grasping the hanger by the pivot-and-locking assembly and operating the push button as desired.

5. The method of claim 1, which comprises providing a dual-configuration hanger wherein the pivot-and-locking assembly also includes a non-locking detent for holding the arms in the open configuration.

6. A dual-configuration hanger comprising:
a pair of hook-like curved arms each having a proximate end and a distal end; and
a pivot-and-locking assembly joining said proximate ends and allowing said arms to pivot between a closed configuration in which said distal ends are in contact with or in close proximity to each other so that said arms define essentially a closed loop, and an open configuration in which said distal ends are spaced from and facing each other to define an opening in between said distal ends and said curved arms define a pair of opposed hooks with facing ends;
said pivot-and-locking assembly including a locking mechanism for releasably locking said arms in the closed configuration;
said pivot-and-locking assembly having a housing including two halves which rotate with reference to each other, said proximate ends of said arms being fixedly attached to respective ones of said housing halves; and wherein
said locking mechanism releasably locking said housing halves to each other against rotation in the closed configuration.

7. The dual-configuration hanger of claim 6, wherein said proximate ends of said arms are integral with said respective ones of said housing halves.

8. The dual-configuration hanger of claim 6, wherein said distal ends are generally spherical and elastomeric.

9. The dual-configuration hanger of claim 8, wherein said distal ends comprise substrates with an elastomer coating.

10. The dual-configuration hanger of claim 6, wherein said pivot-and-locking assembly includes a push button for releasing said locking mechanism from the closed configuration.

11. The dual-configuration hanger of claim 10, wherein said arms and said push button are arranged for one-hand operation such that said hanger can be grasped by said pivot-and-locking assembly, said arms manipulated between the closed and open configurations, and said push button operated as desired.

12. The dual-configuration hanger of claim 6, wherein said pivot-and-locking assembly also includes a non-locking detent for holding said arms in the open configuration.

13. A dual-configuration hanger comprising:
a pair of hook-like curved arms each having a proximate end and a distal end; and
a pivot-and-locking assembly joining said proximate ends and allowing said arms to pivot between a closed configuration in which said distal ends are in contact with or in close proximity to each other so that said arms define essentially a closed loop, and an open configuration in which said distal ends are spaced from each other to define an opening in between said distal ends and said curved arms define a pair of opposed hooks;
said pivot-and-locking assembly including a locking mechanism for releasably locking said arms in the closed configuration;
said pivot-and-locking assembly having a generally spherical housing including two halves which rotate with reference to each other, said proximate ends of said arms being fixedly attached to respective ones of said housing halves; and wherein
said locking mechanism releasably locks said housing halves to each other against rotation in the closed configuration.

14. The dual-configuration hanger of claim 13, wherein said proximate ends of said arms are integral with said respective ones of said housing halves.

15. A method for hanging an article having a handle from either the handle of a carrier device or from a horizontal table surface, said method comprising:
providing a dual-configuration hanger including
a pair of hook-like curved arms each having a proximate end and a distal end, and
a pivot-and-locking assembly joining the proximate ends and allowing the arms to pivot between a closed configuration in which the distal ends are in contact with or in close proximity to each other so that the arms define essentially a closed loop, and an open configuration in which the distal ends are spaced from each other to define an opening in between the distal ends and the curved arms define a pair of opposed hooks,
the pivot-and-locking assembly including a locking mechanism for releasably locking the arms in the closed configuration;
in order to hang the article from the horizontal table surface, releasing the locking mechanism and moving the arms to the open configuration, positioning the distal end of one of the arms on the horizontal table surface so that the other arm hangs below the table surface, and positioning the article handle on the hook defined by the other arm; and in order to hang the article from the carrier device handle, encircling the carrier device handle and the article handle within the curved arms by relatively moving the carrier device handle and the article handle through the opening between the distal ends of the arms, and then moving the arms to the closed configuration and allowing the locking mechanism to lock the arms in the closed configuration; wherein:

the pivot-and-locking assembly has a generally spherical housing including two halves which rotate with reference to each other, said proximate ends of the arms being fixedly attached to the respective ones of the housing halves; and wherein the locking mechanism releasably locks the housing halves to each other against rotation in the closed configuration.

* * * * *